United States Patent [19]

Seeger, Jr. et al.

[11] 3,861,135

[45] Jan. 21, 1975

[54] ELECTRICAL INTERCONNECTOR AND METHOD OF MAKING

[75] Inventors: Richard E. Seeger, Jr., Topsfield; William J. Lynn, Groveland; Frank Joseph Glaister, Salisbury, all of Mass.

[73] Assignee: Chomerics, Inc., Woburn, Mass.

[22] Filed: Feb. 8, 1973

[21] Appl. No.: 330,684

[52] U.S. Cl. ............... 58/50 R, 58/23 R, 174/88 R, 340/324

[51] Int. Cl. ..... G04b 19/30, G04c 3/00, H01r 5/00

[58] Field of Search ............. 58/23 R, 50 R, 53–56; 174/52 R, 52 PE, 52 S, 88 R; 350/160 LC; 340/324

[56] References Cited

UNITED STATES PATENTS

| | | | |
|---|---|---|---|
| 3,289,048 | 11/1966 | Allegretti et al. | 174/52 RX |
| 3,427,797 | 2/1969 | Kimura et al. | 58/23 BA |
| 3,621,112 | 11/1971 | Stickley | 174/52 S |
| 3,712,047 | 1/1973 | Girard | 350/160 LC |
| 3,728,007 | 4/1973 | Myrenne et al. | 350/160 LC |
| 3,774,232 | 11/1973 | May | 174/52 S |

OTHER PUBLICATIONS

The Electronic Engineer, "Multiplexing, Decoding and Driving: Liquid Crystals," Nov. 1972, pp. 70 and 71.

The Electronic Engineer, "Is It Time for Digital Watches?" Nov. 1972, pp. 71 and 72.

*Primary Examiner*—Edith Simmons Jackmon
*Attorney, Agent, or Firm*—Dike, Bronstein, Roberts, Cushman & Pfund

[57] ABSTRACT

An electrical interconnector for coupling circuit broad terminals or the like to a liquid crystal package, an integrated circuit package or the like and which includes an insulating base member having a plurality of electrically conductive and elastomeric pads each of which extends from one face of the base member along an open channel or between teeth in the wall of the base member and to the opposite face of the base member. In addition, a new and improved injection molding method of construction of the interconnector is disclosed.

25 Claims, 10 Drawing Figures

ELECTRICAL INTERCONNECTOR AND METHOD OF MAKING

BACKGROUND OF THE DISCLOSURE

This invention is directed to a new and improved electrical interconnector assembly for coupling terminals at the edge of a liquid crystal package, integrated circuit array or the like to a circuit board or the like.

Liquid crystal packages have begun to gain prominence in many application as for example, as a display for digital watches. See the magazine *The Electronic Engineer* November, 1972, pages 70–72 published by the Chilton Company, Philadephia, Pennsylvania.

Such liquid crystal packages have in the past been generally coupled to the circuit board containing elements for controlling the liquid crystals via wires soldered between the circuit board and the terminal of the liquid crystal package.

Although this method is quite adequate it does suffer disadvantages in that soldering is expensive and replacement of the circuit board or the liquid crystal package is most difficult in that the wires must be unsoldered. In addition, failure may occur due to shock or vibration causing an electrical disconnect.

Interconnectors have been reported in patent literature but they suffer disadvantages in that they are difficult to inexpensively manufacture in volume quantities.

In view of the foregoing there has arisen the demand for a new and improved interconnector that would be inexpensive to manufacture yet provide the advantages necessary to overcome the disadvantages of solder and/or wire interconnections.

SUMMARY OF THE DISCLOSURE

The present invention in the preferred embodiment provides a new and improved interconnector particularly suited to interconnect a liquid crystal substrate and a printed circuit board. The interconnector of the present invention utilizes electrically conductive elastomeric contacts positioned and supported in open channels or in the interdentil space between teeth formed in one or more sidewalls of a dielectric carrier base to provide a gas-tight, shock isolated connection between the liquid crystal substrate and the printed circuit board.

In the preferred embodiment the elastomeric contacts are preferably filled with metal so that the resistivity of the pad is substantially independent of the contact pressure.

The present invention also provides a new improved method for inexpensively molding by injection molding the interconnector of the invention.

DECRIPTION OF THE DRAWINGS

DESCRIPTION OF THE PREFERRED EMBODIMENT OF THIS INVENTION

Figure 1:
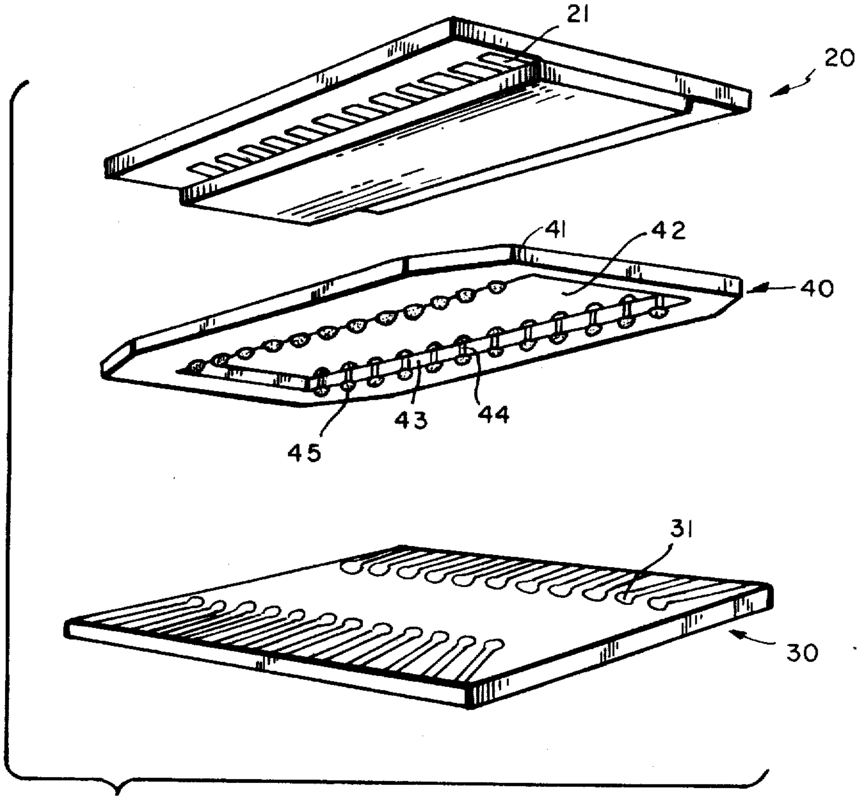
FIG. 1 is a perspective view illustrating the interconnector of the invention, a liquid crystal package and a printed circuit board.

Reference should now be had to FIGS. 1–5 for a description of the preferred form of the interconnector of this invention. At 20 there is shown a liquid crystal package which may be mounted in a watch casing 50 to display characters (FIG. 5) as shown. See the aforementioned pages 70–72 in the magazine *The Electronic Engineer* for further details.

The underside of the package 20 includes electrical contacts 21 for the various character electrodes (not shown) in the liquid crystal package. In order to drive the various character electrodes through the contacts 21, there is provided a conventional printed circuit board 30 which will ordinarily include transistors, capacitors, resistors, etc., mounted thereon and coupled together in various circuit configurations.

At 31 there are shown output electrical contacts which would be coupled to the circuit positioned on the circuit board 30 and which provide electrical signals to drive the character electrodes through the contacts 21. In order to connect the contacts 21 and 31 together, there is provided the interconnector 40 of this invention.

The interconnector 40 comprises a non-conductive or insulator base 41 having an opening or cutout 42 (formed in molding or after molding) therein between the outer sidewalls of the base 41. The cutout 42 extends between the top and bottom surfaces of the base. The term cutout means the space between the sidewalls no matter how formed.

The wall portions of the base defining cutout 42 are provided with a plurality of teeth 43 with channels or the spaces between teeth identified at 44 being hereafter identified as the interdentil space. The teeth and the interdentil space between any teeth may take various shapes and configurations, e.g., partly circular, partly rectangular, etc.

The base or carrier 41 is preferably of a relatively hard but flexible material which is substantially electrically non-conductive or insulating, such as a hard rubber, thermoplastic or thermosetting organic polymer compositions such as phenolics, melanimes, ureas, alkyds, polyamides, polycarbonates as for example, trademarked products, e.g., Ebonite, Bakelite, Formica, Nylon and Lexan. The base may also contain non-electrically conductive reinforcing fibers and/or fillers as well as coloring pigments. Materials such as glass, silica and other mineral fillers can be added.

In its most preferred form the base material is selected such that is is moldable into essentially a flat shape having two substantially parallel and planar flat face surfaces opposite each other. The thickness of the base for most applications is within the range of 5 to 250 mils with a range of 30 to 125 mils being preferred.

Figures 3, 5:
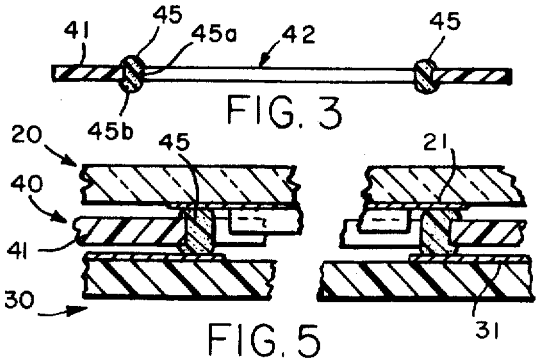
FIG. 3 is a sectional view taken along line 3—3 of FIG. 2.
FIG. 5 is a sectional view taken along line 5—5 in FIG. 4 and which illustrates the coupling of two contacts of the interconnector to two of the liquid crystal package contacts and to two contacts of the printed circuit board.
Figure 2:
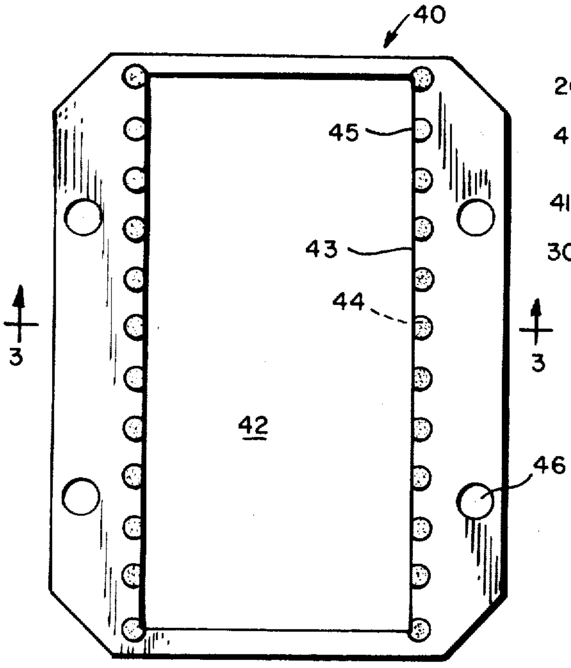
FIG. 2 is a top view of the interconnector of the invention.
Figure 4:
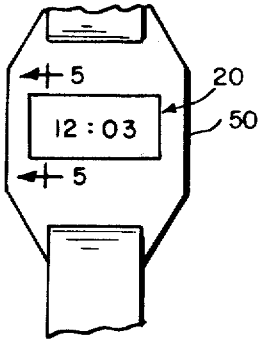
FIG. 4 illustrates in a top view a liquid crystal display for a watch.
Figure 6:
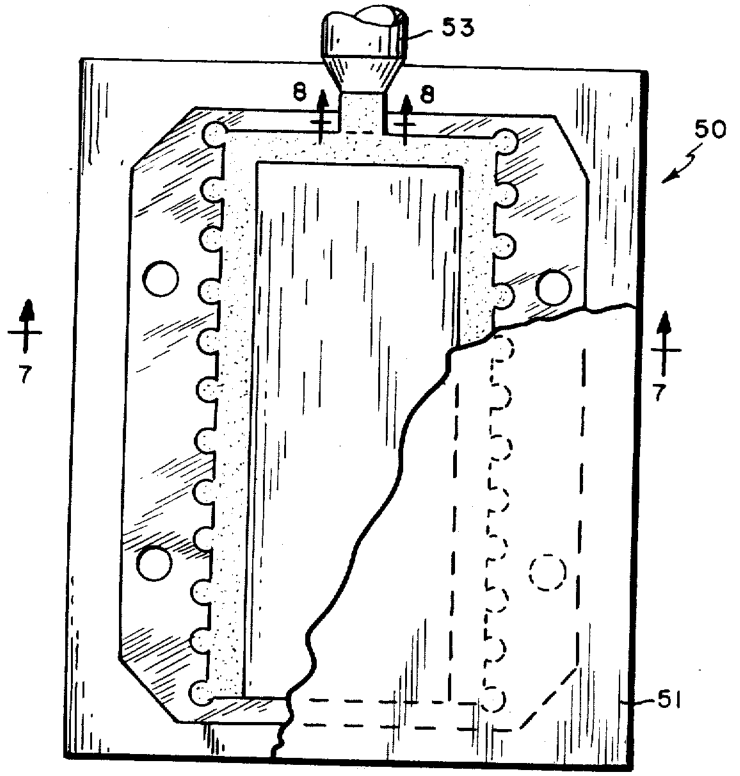
FIG. 6 illustrates injection molding apparatus for molding the interconnector of the invention.
Figure 7:
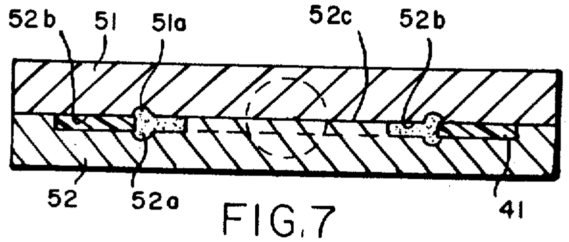
FIG. 7 is a sectional view taken along line 7—7 of FIG. 6.
Figure 8:
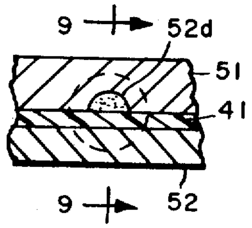
FIG. 8 is a sectional view taken along line 8—8 of FIG. 6.
Figure 9:
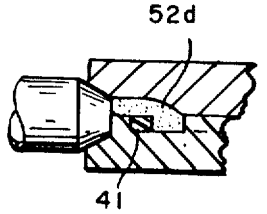
FIG. 9 is a sectional view taken along line 9—9 of FIG. 8.

After molding, the base should preferably have a flexural modulus while not being brittle in the range of $5 \times 10^5$ to $5 \times 10^6$ Psi with values between $10 \times 10^5$ to $20 \times 10^5$ Psi being preferred. The flexibility of the base or carrier is highly desirable to insure that all electrically conductive elastomer pads or contacts 45 will make good contact with both the package 20 and the printed circuit board when assembled as shown in FIGS. 4 and 5.

The electrically conductive elastomeric contacts 45 are shown held by and positioned between the teeth in the interdentil space. The contacts 45 most preferably at least mechanically adhere to at least a portion of the base wall defining the interdential space to insure that they will stay between the teeth.

Improved adherance may be achieved by using conventional heat activated adhesives to coat the wall defining the interdentil space prior to forming the contacts 45. The pads or contacts 45 of this invention are most preferably of a natural or synthetic polymer containing electrically conductive filler particles, commonly known as conductive rubbers or conductive plastics all of which are hereinafter referred to as conductive plastics. For purposes of this invention it is highly desirable that the conductive plastic composition have the capability of being transformed (by a process known as curing) from a plastic readily deformable condition into a resilient elastic condition, (which resists deformation). It is highly desirable for the purpose of this invention that the polymer selected be of the type which assumes its original shape after a force or pressure causing distortion is removed.

Suitable polymers for the purposes of this invention include elastomerics such as silicone rubber, butadiene/nitrile rubber, and natural rubber among many having elastomeric properties. With polymers having these properties, a gas-tight sealed environmental barrier is formed with the contacts 21 and 31.

The conductive particles useful in this invention include materials such as silver, gold, the noble metals, as well as copper and carbon black all of which for the purposes of this invention will be called electrically conductive particles. Metal coated conductive particles may also be used particularly those having an outer surface of a nobel metal, e.g., silver.

The particles are preferably in the form of a powder and most preferably have a maximum dimension between 0.1M to 10M in any direction. Preferably the conductive plastic contacts 21 have a volume resistivity of less than 10 ohm centimeters and more preferably less than 1 ohm centimeter and preferably less than 0.01 ohm centimeter. Most preferably the amount of conductive particles will range between 20 to 80 percent volume percent of the conductive plastic. In addition to conductive particles, electrically non-conductive extender particles such as silica or plastics may be used as long as elastomeric and electrical properties of the material are not substantially reduced.

As another aspect of this invention, the pad or contact 45 is preferably formed with a narrow neck portion 45*a* and protrusions or heads 45*b* which are not greater in height above the base surface than the distance between teeth to give added mechanical strength. In addition the heads 45*b* are preferably greater in width than the distance between the teeth and overlap the teeth and base top and bottom surfaces so as to securely lock the pads in place.

It is necessary that the heads 45*b* be of a size with respect to the teeth and each other to prevent short circuiting between contacts. It should be understood that the heads 45*b* can be made the same width as the interdentil space and in this case it should be realized that when the interconnector pads are placed under compression, that is when assembled as shown in FIGS. 4 and 5, the pads will extend past the hole opening to lock the contacts in place.

As another important feature of this invention it is most preferable that all contact extremities (their height above the base surface) be in the same plane to insure that good electrical contact is made.

It has been found in practice that a contact or pad having the lowest resistance is the most saleable. Thus contacts having less than one-half ohm per contact are the most preferred, although contacts having an overall resistance between 1 to 1,000 ohms per contact are perfectly suitable depending upon the application.

In order to construct the interconnector of this invention, a base member preferably of flexible material is chosen and cutouts and teeth are formed therein by drilling, stamping or by other means. Alternately the base member may be molded in a properly shaped mold to provide the desired shape.

Thereafter the interdentil space between teeth are preferably coated with a conventional heat activated adhesive suitable for bonding the contacts (to be formed) to the walls defining the interdentil space.

Thereafter the base is inserted into a conventional molding apparatus (see FIGS. 6–10) of the type to allow an uncured elastomeric polymer, e.g., conventional uncured silicone rubber, loaded with conductive particles, e.g., conventional silver, to flow and be inserted into the mold to fill in the interdentil space and thus form the contact heads 45*b* and the contact portions 45*a*.

Thereafter the polymer is cured to form the contacts and the interconnector is removed from the mold to permit removal of any flashing resulting from the molding process.

More particularly the molding apparatus 50 of this invention comprises top and bottom mold portions 51 and 52 with each of the mold portions interior including a plurality of cavities 51*a* and 52*a* for forming the heads 45*b*. In addition, the mold portion is provided with a cavity 52*b* for locating the base 41 and permitting the electrically conductive particle filled polymer (hereinafter sometimes called the conductive polymers) to flow into the area between the mold raised portion 52*c* and the teeth 43 into the interdentil space 44. The conductive polymer is forced under pressure into the mold portions through nozzle 53 through a passage 52*d* over the base 41.

Figure 10:
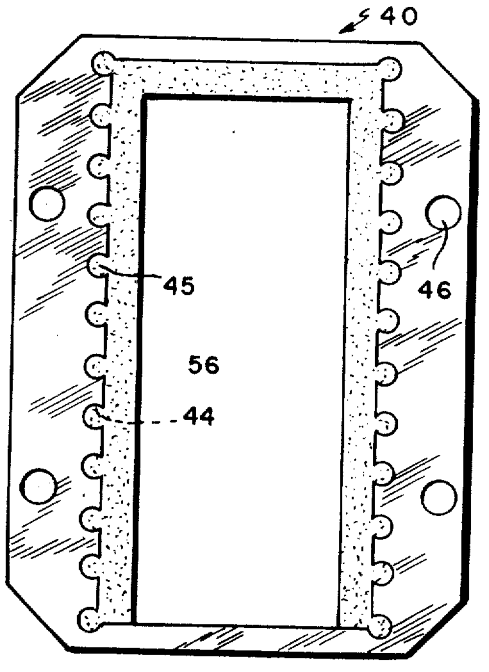
FIG. 10 illustrates the interconnector after leaving the molding apparatus of FIGS. 6–9 and before the removal of flashing formed in the molding process.

The interconnector as it comes out of the mold after curing of the conductive polymer is shown in FIG. 10. Thereafter the flashing 56 is cut away to provide the interconnector shown in FIGS. 1 to 5.

We claim:

1. In a watch casing, a liquid crystal package for displaying information, said package having a plurality of electrical contacts for coupling signals to character electrodes thereof, means having a plurality of contacts for providing signals to the electrical contacts of said liquid crystal package, and an interconnector positioned between said package and said means having a plurality of contacts positioned between said package and said, said interconnector comprising an insulator material base having a plurality of teeth along at least one sidewall thereof and an elastomeric electrically conductive cured plastic contact positioned in the interdentil space between said teeth, said contacts protruding above and below the top and bottom surfaces of the teeth and adhering to the sidewall portion defining the interdentil space, said interconnector contacts connecting said contacts of said means having a plurality of contacts to said contacts of said liquid crystal package.

2. In a watch casing claimed in claim 1 in which the contacts have a volume resistivity of less than 10 ohm centimeters.

3. In a watch casing claimed in claim 1 in which the contacts have a volume resistivity of less than 1 ohm centimeters.

4. In a watch casing claimed in claim 1 in which the base is constructed of flexible material.

5. In a watch casing claimed in claim 1 in which the height of the contacts above the teeth top and bottom surfaces is less than the largest dimension of the distance between the adjacent teeth.

6. In a watch casing claimed in claim 1 in which the contact portion above and below the teeth top and bottom surfaces are greater in width than the distance between the adjacent teeth.

7. In a watch casing according to claim 1 in which the base has a cutout therein between the outer wall of the base in which teeth are formed along wall means of the cutout and in which the contacts are positioned in the interdentil space between the teeth.

8. In a watch casing according to claim 7 in which a portion of the liquid crystal package fits in the cutout.

9. In a watch casing, a liquid crystal package for displaying information, said package having a plurality of electrical contacts for coupling signals to character electrodes thereof, a circuit board having a plurality of contacts for providing signals to the electrical contacts of said liquid crystal package, and an interconnector positioned between said package and said circuit board, said interconnector comprising an insulator material base having a plurality of elastomeric electrically conductive plastic contacts supported by said base, said contacts protruding above and below the top and bottom surfaces of the base and making contact with the contacts of said package and said circuit board.

10. In a watch casing claimed in claim 9 in which the elastomeric contacts have a volume resistivity of less than 10 ohm centimeters.

11. In a watch casing claimed in claim 9 in which the contacts have a volume resistivity of less than 1 ohm centimeters.

12. In a watch casing according to claim 9 in which the contacts are of a silicone gum and in which conductive particles having an outer silver surface are dispersed therein.

13. In a watch casing claimed in claim 9 in which the base is constructed of flexible material.

14. In a watch casing claimed in claim 9 in which the height of the contacts above the top and bottom surface is less than the distance between the adjacent elastomeric contacts.

15. In a watch casing according to claim 9 in which the base has a cutout therein between the outer wall of the base in which teeth are formed along wall means of the cutout and in which the contacts are positioned in the interdentil space between the teeth.

16. In a watch casing according to claim 15 in which a portion of the liquid crystal package fits in the cutout.

17. In a watch casing according to claim 9 in which electrically conductive particles are dispersed throughout each of the elastomeric contacts.

18. In a watch casing, a sandwich of a liquid crystal package for displaying information, said package having a plurality of rows of electrical contacts for coupling signals to character electrodes thereof, a circuit board having a plurality of contacts for providing signals to the electrical contacts of said liquid crystal package, and an interconnector positioned between said package and said circuit board, said interconnector having a plurality of elastomeric electrically conductive plastic contacts supported by a base, said contacts protruding above and below the top and bottom surfaces of the base and making contact with the contacts of said package and said circuit board, and said base having a cutout therein positioned between at least two rows of contacts into which a portion of the liquid crystal package extends.

19. In a watch casing claimed in claim 9 in that the base is of flexible material.

20. In a watch casing according to claim 9 wherein said means having a plurality of contacts comprises a printed circuit board.

21. In a watch casing according to claim 10 wherein said means having a plurality of contacts comprises a printed circuit board.

22. In a watch casing according to claim 3 wherein said means having a plurality of contacts comprises a printed circuit board.

23. In a watch casing according to claim 4 wherein said means having a plurality of contacts comprises a printed circuit board.

24. In a watch casing according to claim 5 in which said means having a plurality of contacts comprises a printed circuit board.

25. In a watch casing according to claim 19 in which the base has a cutout and in which a portion of the liquid crystal package fits in the cutout.

* * * * *